(12) United States Patent  
Lashley et al.

(10) Patent No.: US 7,042,986 B1  
(45) Date of Patent: May 9, 2006

(54) DSP-ENABLED AMPLIFIED TELEPHONE WITH DIGITAL AUDIO PROCESSING

(75) Inventors: David Glenn Lashley, Cartersville, GA (US); Robert L. Doss, Jr., Ringgold, GA (US)

(73) Assignee: Plantronics, Inc., Santa Cruz, CA (US)

( * ) Notice: Subject to any disclaimer, the term of this patent is extended or adjusted under 35 U.S.C. 154(b) by 275 days.

(21) Appl. No.: 10/243,026

(22) Filed: Sep. 12, 2002

(51) Int. Cl.  
*H04M 11/00* (2006.01)

(52) U.S. Cl. .................... 379/52; 379/390.01

(58) Field of Classification Search ............. 379/52, 379/90.01, 110.01, 388.01, 387.01, 387.02, 379/388.03, 390.01, 395, 419, 420.01; 381/60, 381/312, 314, 322; 704/271; 438/3, 785, 438/786–788, 791–792, 393–399  
See application file for complete search history.

(56) References Cited

U.S. PATENT DOCUMENTS

| 5,027,410 | A | * | 6/1991 | Williamson et al. ........ 381/314 |
| 5,734,713 | A | | 3/1998 | Mauney et al. |
| 5,784,456 | A | * | 7/1998 | Carey et al. ................ 379/419 |
| 5,896,451 | A | | 4/1999 | Deas |
| 6,212,496 | B1 | * | 4/2001 | Campbell et al. ........... 704/271 |
| 6,724,862 | B1 | * | 4/2004 | Shaffer et al. .............. 379/52 |
| 2002/0106077 | A1 | * | 8/2002 | Moquin et al. ........ 379/406.02 |
| 2003/0064746 | A1 | * | 4/2003 | Rader et al. ................. 381/60 |

FOREIGN PATENT DOCUMENTS

| JP | 11068646 A | * | 3/1999 |
| JP | 2000209698 A | * | 7/2000 |
| WO | WO 03/026349 A1 | | 3/2003 |

* cited by examiner

*Primary Examiner*—Wing Chan  
(74) *Attorney, Agent, or Firm*—Jung-hua Kuo (57) ABSTRACT

A DSP-enabled system and method for increasing intelligibility of audio on amplified telephones by providing digital audio processing customizable based on characteristics of hearing loss specific to individual end users are disclosed. The DSP-enabled amplified telephone generally comprises a DSP capable of implementing at least one digital processing mode for processing audio input, a volume control for allowing the user to select a volume control level, and a controller for interfacing between the DSP and the volume control. The DSP is optionally programmable to implement a processing mode selected from multiple processing modes that the DSP is capable of implementing. The mode is selected based upon the user's hearing loss characteristics. The DSP may be further customized by being programmed with frequency response, compression ratio, and/or knee point according to hearing loss characteristics of the user. The DSP may implement digital TILL, BILL, and/or PILL (treble, bass, and programmable increase at low levels, respectively), all of which apply more amplification to softer inputs than to louder inputs, as well as input compression, output compression, and/or finite impulse response (FIR) filter tone control.

30 Claims, 7 Drawing Sheets

DSP-ENABLED AMPLIFIED TELEPHONE WITH DIGITAL AUDIO PROCESSING

RELATED APPLICATIONS

This application is related to U.S. patent application Ser. No. 10/243,292, filed Sep. 12, 2002, Ser. No. 10/243,003, filed Sep. 12, 2002; and Ser. No. 10/243,025, filed Sep. 12, 2002.

BACKGROUND OF THE INVENTION

1. Field of the Invention

The present invention relates generally to high performance amplified telephones. More specifically, a DSP-enabled system and method for increasing intelligibility of audio on amplified telephones by providing digital audio processing customizable based on characteristics of hearing loss specific to individual end users are disclosed.

2. Description of Related Art

Figure 1:
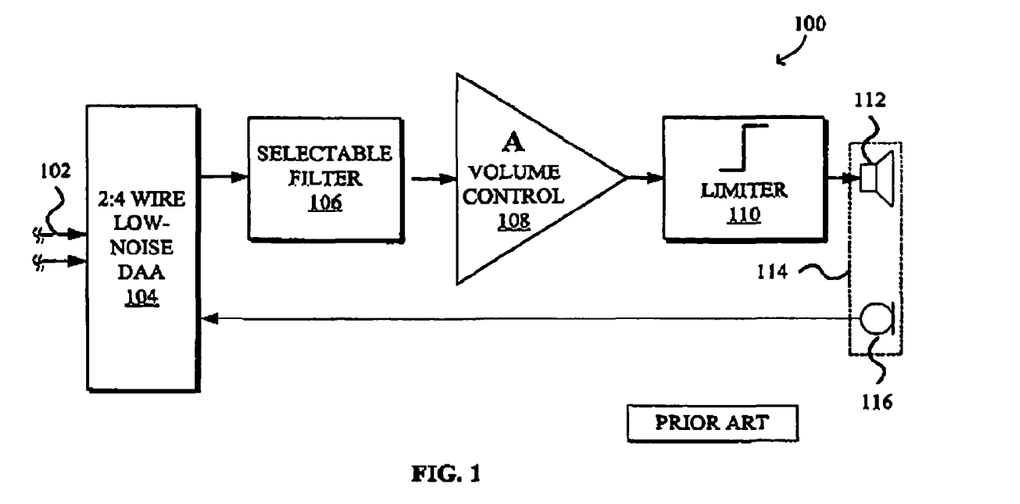
FIG. 1 is a block diagram illustrating how audio is processed by an exemplary conventional amplified telephone.

Conventional amplified telephones amplify audio for hearing-impaired users. Such conventional amplified telephones generally provide simple tone control and volume control. FIG. 1 is a block diagram illustrating how audio is processed by an exemplary conventional amplified telephone 100. Audio signals are carried over twisted-pair copper telephone wires 102 to a 2:4 wire low-noise DAA (data access arrangement) 104. The DAA 104 is a hybrid, i.e., a circuit that divides a single transmission channel into two, one for each direction, and/or combines two transmission channels into one. Thus, the DAA 104 divides a single transmission channel received from the twisted-pair copper wires 102 into two channels (transmit and receive) and transmits signals on the receive channel to a selectable or optional filter 106. In addition, the DAA 104 also receives a transmission channel input from a microphone 116 of a handset or headset 114, for example, and combines this with the receive channel in the DAA for transmission over the twisted-pair copper telephone wires 102. It is noted that although physical telephone wires 102 are shown and described herein, any suitable method for telephone signal transmission may be implemented such as wireless cellular transmission.

When activated, the selectable filter 106 filters the received audio in order to apply a frequency tilt. Output from the selectable filter 106 is received by the amplifier or volume control 108 which, when the filter is not activated, provides a nearly flat gain typically over a frequency range of 300 HZ to 3500 Hz. Generally, a maximum of 30 dB of gain over nominal is provided by the volume control 108 due to feedback between the microphone 116 and a speaker 112 of the handset 114. The feedback results in generating a howling noise at the speaker 112 similar to when a microphone is placed too close to a public address (PA) system speaker. Nominal is generally considered to be the level output by the telephone speaker 112 that complies with EIA RS-470B when the volume level set to the minimum.

The volume control 108 outputs to a limiter 110 that limits the output level of the telephone speaker 112. For example, the limiter 110 may limit the output level of the telephone speaker 112 to 124 dBSPL (decibel sound pressure level) of acoustic power as measured in a 2 cc coupler in order to meet the safety requirements of UL1950 $3^{rd}$ Edition. As is evident, conventional amplified telephones that compensate for mild to moderate hearing loss generally use only analog circuitry and thus provide only limited capability for the user to tailor the tone response to more closely match the user's hearing loss.

Figure 2:
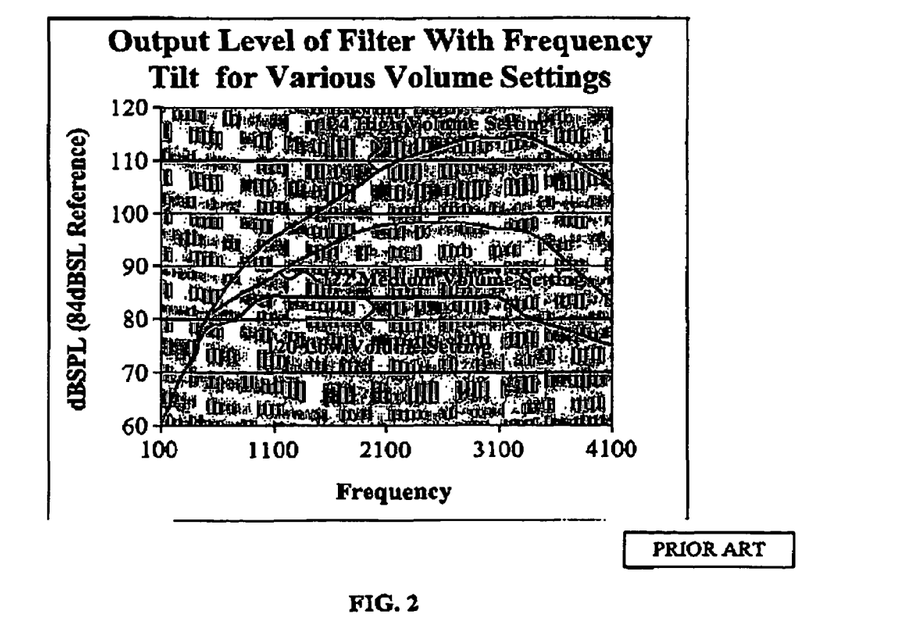
FIG. 2 is a graph illustrating the effect of frequency tilt by a selectable filter of the amplified telephone of FIG. 1.

FIG. 2 is a graph illustrating the effect of the frequency tilt of the selectable filter 106. Lines 120, 122, 124 correspond to the effect of the frequency tilt when the volume control is set at low, medium, and high volume settings, respectively. As shown, the frequency tilt filter 106 applies greater amplification for higher frequency audio as volume control is increased. At minimum or low volume gain, there is little or no difference between filtered and non-filtered audio, resulting in a relatively flat frequency response as shown by line 120. It is noted that the frequency tilt should generally not be applied for users with a relatively flat hearing loss. It is further noted that regardless of whether the filter 106 is activated, the response of the microphone 116 is not affected thereby.

As evident from FIG. 2, the amount of frequency tilt generated by the filter 106, if selected, is dependent upon the volume setting. In other words, tone control using the selectable the tilt filter 106 is integrated into the volume control 108 and thus automatically applies a predetermined amount of high frequency emphasis. Although such integrated tone control is relatively simple for the end user, the integrated tone control does not allow each user to tailor the tone response to more closely match the user's type of hearing loss. Rather, the integrated tone control applies the predetermined amount of high frequency emphasis regardless of the hearing loss characteristics of the individual user.

However, the hearing loss characteristics of individual users vary beyond what is compensated by a mere differentiation between a flat response and a frequency tilt or the use of a tone control. In particular, more seriously hearing-impaired users will generally benefit from better audio processing algorithms that can be tailored to better compensate and more accurately match the individual user's hearing loss.

Thus, it would be desirable to provide an amplified telephone with a better audio processing algorithm that can be tailored to compensate for and more accurately match the individual user's hearing loss. Ideally, the amplified telephone would provide more powerful and intelligent amplification for its hearing-impaired users. This is particularly beneficial because an amplified telephone is the often first "hearing aid" many hearing-impaired people purchase.

SUMMARY OF THE INVENTION

A DSP-enabled system and method for increasing intelligibility of audio on amplified telephones by providing digital audio processing customizable based on characteristics of hearing loss specific to individual end users are disclosed. The DSP-enabled methodologies implemented may be applied to corded and cordless amplified telephones to enable users to personalize the audio output of the telephone receiver, thereby resulting in increased intelligibility. The users may adjust the volume, frequency response, compression ratios, and/or knee points of the DSP-enabled amplified telephones to achieve the desired results. It should be appreciated that the present invention can be implemented in numerous ways, including as a process, an apparatus, a system, a device, or a method. Several inventive embodiments of the present invention are described below.

The DSP-enabled amplified telephone generally comprises a DSP capable of implementing at least one digital audio processing mode for processing audio input, a volume control for allowing the user to select a volume control level, and a microcontroller for interfacing between the DSP and the volume control. The telephone typically also includes an analog to digital (A/D) converter for converting analog signals received by the amplified telephone to digital signals for input to the DSP and a digital to analog (D/A) converter for converting digital signals output by the DSP to analog signals for the telephone speaker. The telephone may also include another A/D converter for converting analog signals received by a telephone microphone to digital signals for input to the DSP and another D/A converter for converting digital signals output by the DSP to analog signals for transmission over the telephone lines.

The DSP is optionally programmable to implement a processing mode selected from multiple processing modes that the DSP is capable of implementing. The mode is selected based upon the user's hearing loss characteristics. The DSP may be further customized by being programmed with frequency response, compression ratio, and/or knee point according to hearing loss characteristics of the user. The DSP may implement digital TILL, BILL, and/or PILL (treble, bass, and programmable increase at low levels, respectively), all of which apply more amplification to softer inputs than to louder inputs, as well as input compression, output compression, and/or finite impulse response (FIR) filter tone control.

These and other features and advantages of the present invention will be presented in more detail in the following detailed description and the accompanying figures which illustrate by way of example the principles of the invention.

BRIEF DESCRIPTION OF THE DRAWINGS

The present invention will be readily understood by the following detailed description in conjunction with the accompanying drawings, wherein like reference numerals designate like structural elements, and in which.

DESCRIPTION OF SPECIFIC EMBODIMENTS

A DSP-enabled system and method for increasing intelligibility of audio on amplified telephones by providing digital audio processing customizable based on characteristics of hearing loss specific to individual end users are disclosed. The following description is presented to enable any person skilled in the art to make and use the invention. Descriptions of specific embodiments and applications are provided only as examples and various modifications will be readily apparent to those skilled in the art. The general principles defined herein may be applied to other embodiments and applications without departing from the spirit and scope of the invention. Thus, the present invention is to be accorded the widest scope encompassing numerous alternatives, modifications and equivalents consistent with the principles and features disclosed herein. For purpose of clarity, details relating to technical material that is known in the technical fields related to the invention have not been described in detail so as not to unnecessarily obscure the present invention.

Figure 3:
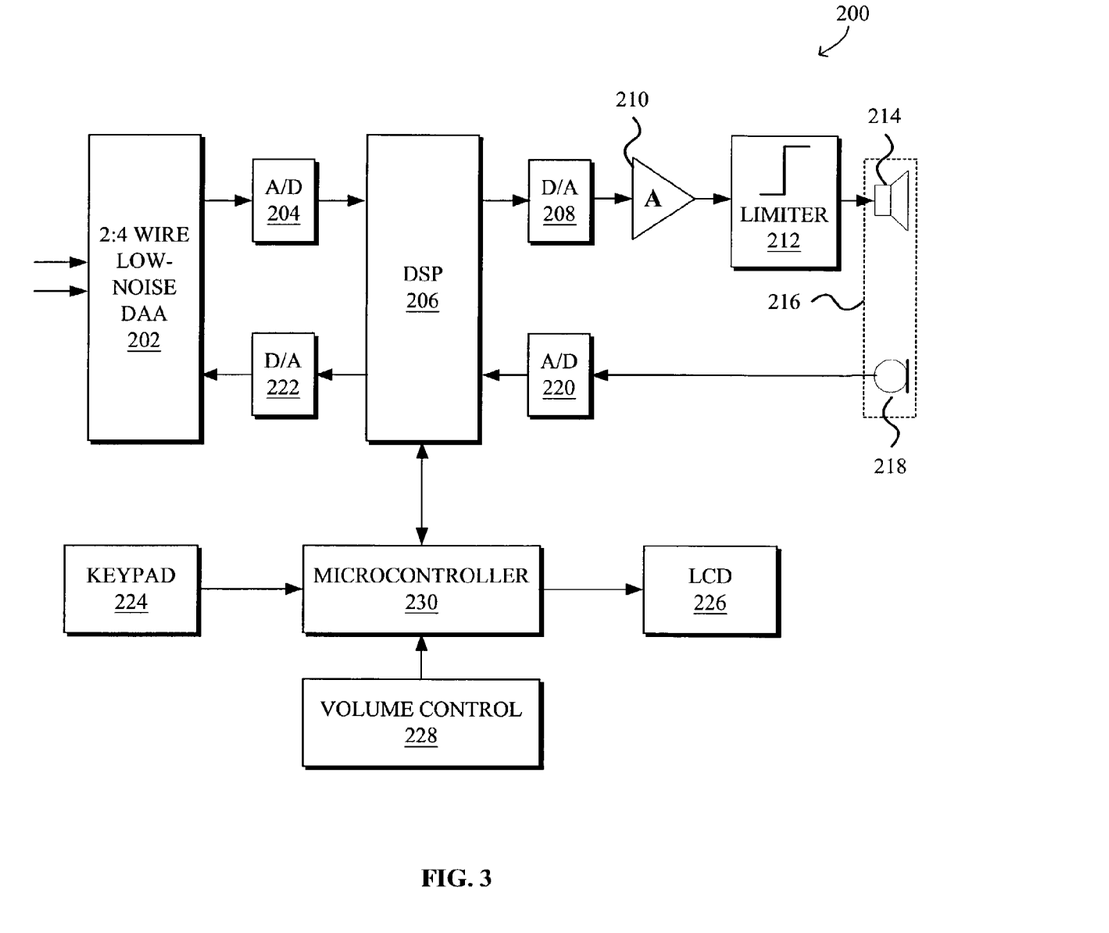
FIG. 3 is a block diagram of an exemplary embodiment of a DSP-enabled amplified telephone that provides digital signal processing on audio signals and is customizable based on characteristics of hearing loss specific to individual end users.

FIG. 3 is a block diagram of an exemplary embodiment of a DSP-enabled amplified telephone 200 that provides digital signal processing on audio signals and is customizable based on characteristics of hearing loss specific to the individual end user. As shown, the DSP-enabled amplified telephone 200 includes a 2:4 wire low-noise DAA 202, an amplifier 210, a peak limiter 212, and a handset or a headset 216 comprising a speaker 214 and a microphone 218, similar to corresponding components of the conventional amplified telephone as described above with reference to FIG. 1.

In addition, the DSP-enabled amplified telephone 200 includes a digital signal processor (DSP) 206 that digitally processes digital audio signals received from analog-to-digital (A/D) converters 204, 220 and output to digital-to-analog (D/A) converters 208, 222. In particular, the A/D converter 204 converts analog signals received from the DAA 202 and outputs digital signals to the DSP 206. The D/A converter 208 converts digital signals received from the DSP 206 and outputs analog signals to the amplifier 210. Where analog audio signals from the microphone 218 are also processed by the DSP as shown in the preferred embodiment of FIG. 3, the telephone 200 additionally includes the A/D converter 220 that converts analog signals from the microphone 218 for input to the DSP 206 and the D/A converter 222 that converts digital signals output by the DSP 206.

The DSP-enabled amplified telephone 200 preferably also includes a microcontroller 230, a keypad 224, a display such as an LCD display 226, and a volume control 228. The keypad 224 may be similar to a conventional telephone keypad with 0–9 digit keys for dialing and for optionally programming the telephone as well as other keys to facilitate the user with various other functionalities of the telephone. The keypad 224 preferably includes text labels either directly on each key and/or adjacent to each key to indicate the function of the corresponding key. In addition, certain keys of the keypad 224 may optionally have LED lights adjacent to the key to indicate the status of the corresponding feature. For example, a lit LED light may indicate that the feature is selected, an unlit LED light may indicate that the feature is not selected, and a flashing LED light may indicate that the corresponding feature is being programmed and/or that there is an error with the corresponding feature. The LCD display 226 may display messages that, for example, facilitate the user in programming the telephone, caller ID information, and/or any other information. The volume control 228 allows the user to select a desirable amplification level. Differentiation among various volume levels is preferably achieved by the volume control 228 external to the DSP. In addition, various switches may be provided to enable the user to select or program any given features of the telephone such as volume, frequency response, compression ratios, and/or knee points of the DSP-enabled amplified telephone.

The microcontroller 230 interfaces between the DSP 206 and the keypad 224, the LCD display 226, and the volume control 228. Although shown as separate components, the DSP 206 and the microcontroller 230 may be an integral component. For example, the microcontroller 230 may transmit data containing user inputs received via the keypad 224 and/or the level at which the volume control 228 is set to the DSP 206. The microcontroller 230 also receives data from the DSP 206 that can be displayed on the LCD 226.

The DSP 206 provides at least one audio processing algorithm that is more complex than simple volume and tone control. Specifically, the DSP 206 preferably provides signal processing algorithms similar to those provided by digital hearing aid products that typically result in the amplified telephone 200 amplifying soft sounds more than loud sounds and preferably is customizable for the individual user in order to achieve optimal results. Preferably, several audio processing modes or methodologies are provided by the DSP 206 of the telephone 200. Examples of audio processing modes that may be implemented in the DSP 206 include input compression, output compression, treble increase at low levels (TILL), bass increase at low levels (BILL), programmable increase at low levels (PILL), finite impulse response (FIR) filter tone control, and any combination thereof. The mode best suited for the user can be selected based on the hearing loss characteristics specific to the individual user and is typically more complicated than simple volume and tone control.

The DSP 206 implements the various modes that are independent of each other. While the algorithms implemented by the DSP 206 are intended to replicate the performance of a digital hearing aid, these algorithms are preferably customized to account for the limited bandwidth and dynamic range of the telephone. Preferably, the signal processing is implemented entirely in software on the DSP telephony platform.

The DSP-enabled telephone 200 allows the user to hear better on the telephone with increased intelligibility. For example, words sound clearer and sharper to the hearing impaired on the DSP-enabled telephone 200. It is noted that the DSP-enabled telephone 200 may be a corded telephone, a cordless telephone where the speaker 214 and the microphone 218 are embodied in a handset or a headset 216.

The various audio processing modes that may be implemented in the DSP 206, e.g., input and output compression, TILL/BILL/PILL and/or tone control, will now be described below. An overview of hearing and hearing loss will first be presented below as a background to the discussion on the various DSP-enabled audio processing modes implemented.

Characteristics of Hearing and Hearing Loss

Figure 4:
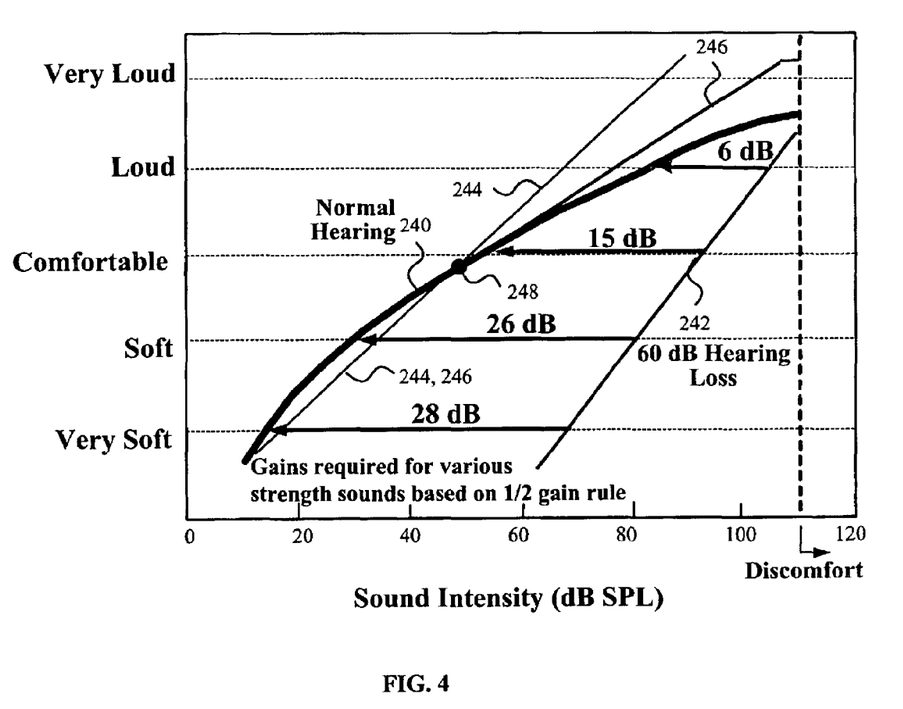
FIG. 4 is a graph illustrating perceived loudness versus sound intensity for a person with normal hearing and a person with hearing loss as well as effects of a linear amplifier and an input compressor.

Typically, as hearing loss increases, the dynamic range of the individual hearing profile decreases. The dynamic range of hearing for an individual is generally defined as the range between the individual's threshold of hearing and an uncomfortably loud level. Ideally, hearing aids make soft sounds audible and intelligible but keep loud sounds bearable. FIG. 4 is a graph illustrating the perceived loudness versus the sound intensity for a person with typical normal hearing (line 240) and a person with 60 dB hearing loss (line 242). 60 dB hearing loss refers to the point at which the hearing profile crosses the X axis.

The graph of FIG. 4 also illustrates gain requirements depending upon the perceived loudness. As is evident, the typical hearing impaired person requires more amplification for soft sounds than for loud sounds. For example, soft sounds need to be amplified approximately 26–28 dB while loud sounds only need to be amplified approximately 6–8 dB for the hearing impaired individual. In other words, most people with hearing loss need more amplification for soft sounds amplified than for loud sounds.

Ideally, an amplifier would maintain the distinction between soft and loud sounds while adequately amplifying soft and loud sounds to the level such that the hearing impaired user would perceive the loudness similar to a person with normal hearing would. However, a linear amplifier applies the same amount of gain to input signals regardless of the level of the input as illustrated with line 244 such that adequate amplification of soft sounds (26–28 dB) results in gross over amplification of loud sounds, making loud sounds unbearable.

Input and Output Compression and Peak Limiter

To partially compensate for the deficiency of the linear amplifier illustrated by line 244, the DSP 206 preferably also implements optional input compression and/or output compression. Effect of an input compressor is illustrated by line 246 in FIG. 4. Specifically, the compressor has an associated knee point or compression threshold 248, typically located in the comfortable perceived loudness region, to change the slope of the compression circuit amplification at the knee point 248 so as to more closely fit the normal hearing curve. However, as shown, there still remains some over amplification at the very loud level of the perceived loudness spectrum.

Figure 5:
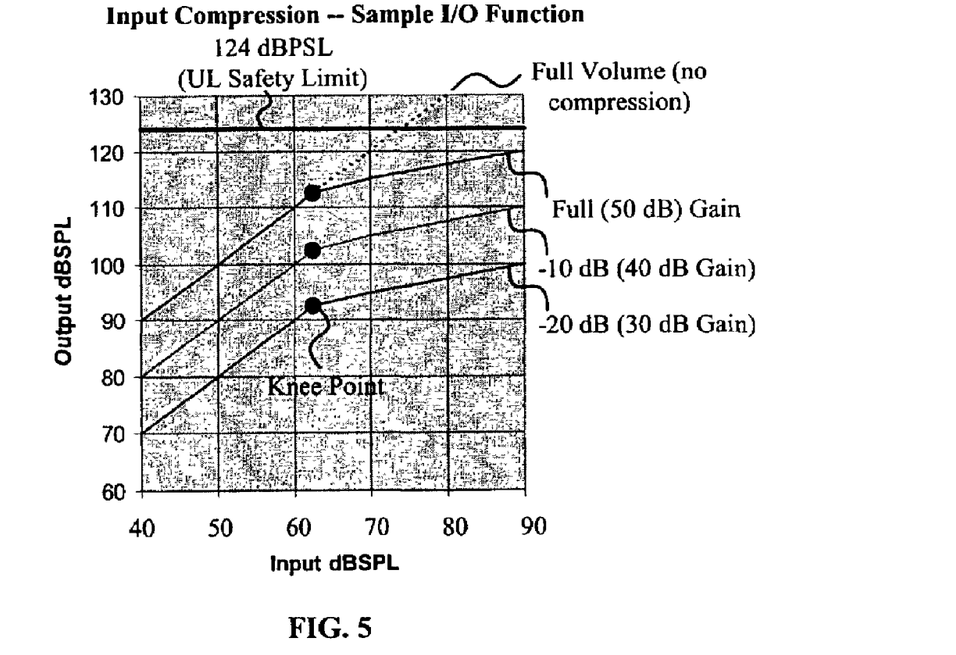
FIG. 5 is a graph illustrating effect of input compression.

FIG. 5 illustrates the effect of input compression in more detail. In FIG. 5, full gain refers to 50 dB of gain while −10 dB and −20 dB (i.e., 40 dB and 30 dB of gain, respectively) are two lower exemplary volume settings shown for illustrative purposes. The dotted line illustrates the output for the full gain or full volume setting without the input compression (i.e., linear amplifier) such that the output dBSPL would reach 124 dBSPL at approximately 74 dB input dBSPL (i.e., 74 dBPSL plus a gain of 50 dB).

The peak limiter 212, such as back-to-back diodes, functions to limit the output to 124 dBSPL, for example, in order to comply with UL-imposed safety limit of 124 dBSPL for telephone handsets. Thus, by decreasing the slope at input levels above the knee point, input compression prevents excessive hard clipping by the peak limiter 212 and is particularly important in a telephone that achieves higher gains, for example, 50 dB of gain.

To illustrate, in a telephone without a compressor where the nominal conversational level is approximately 70–75 dBSPL, applying a 50 dB of gain results in output levels of 120–125 dBSPL such that the peak limiter would regularly be triggered. When the peak limiter is triggered, total harmonic distortion (THD) increases to greater than 20% and may reach 100%. THD refers to the amount of undesirable harmonics present in an output audio signal expressed as a percentage of the output audio signal. As is evident, it is desirable to provide a powerful telephone having 50 dB gain with compression so as not to regularly and excessively trigger the peak limiter 212, resulting in excessively high THD.

Thus, an input compressor allows the telephone to more effectively amplify softer sounds without excessively amplifying louder sounds. The input compression method simply allows two straight lines with different slopes to be used to better fit the normal hearing curve than with one straight line as is the case with the linear amplifier. However, the dynamic range of the input is compressed into a fixed output dynamic range. In other words, as volume control is adjusted between maximum and minimum gain, the line representing the output response in the graph of FIG. 5 simply shifts vertically such that the output dynamic range does not vary with the volume control setting. Thus, with only input compression, the amount of dynamic range compression is not adjustable with volume control but, rather, remains constant.

Figure 6:
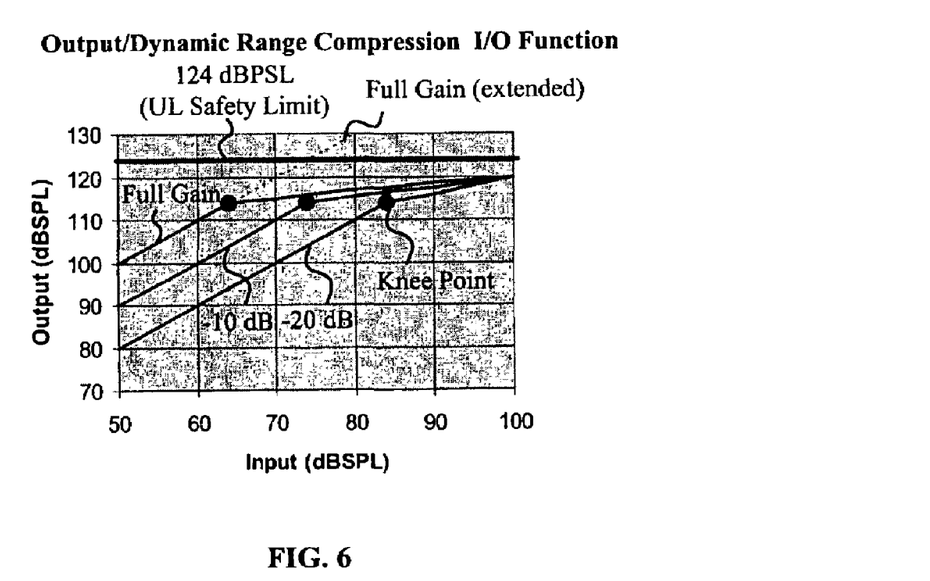
FIG. 6 is a graph illustrating effect of output compression.

To achieve adjustablility of the amount of dynamic range compression, the DSP 206 may implement optional output compression. FIG. 6 is a graph illustrating effect of output or dynamic range compression. Dynamic range compression differs from input compression in that the greater the output gain, the smaller the output dynamic range. But similar to the input compressor, the output compressor also serves to prevent the output level from being excessively peak limited by the peak limiter. As shown in FIG. 6, with a full gain of 50 dB, the output dynamic range is approximately 20 dBSPL (100 to 120 dBSPL); with a gain of 40 dB, the output dynamic range is approximately 30 dBSPL (90 to 120 dBSPL); and with a gain of 30 dB, the output dynamic range is approximately 40 dBSPL (80 to 120 dBSPL). The exemplary output compressor illustrated in FIG. 6 limits the maximum output to 120 dBSPL which includes a backoff of 4 dB from the safety limit of 124 dBSPL. As shown, with the maximum gain of 50 dB, the output dynamic range is approximately 20 dBSPL in which most of the range of input levels is in heavy compression, i.e., portion of the line to the right of the knee point from approximately 65 dBSPL to 100 dBSPL.

The underlying principal and assumption for the output compressor is that as hearing loss increases, the dynamic range of the individual decreases. A greater volume control setting or higher output gain corresponds to greater hearing loss and thus a reduced dynamic range for the hearing impaired individual. Thus, the knee point of the output compressor is located at increasingly lower input levels as the volume control level or gain is increased, resulting in a reduced dynamic output range.

TILL, BILL, and PILL Audio Processing Modes

Although both input and output compressors limit the gain applied to the loudest sounds, neither compressor does a good job of sufficiently amplifying soft sounds while amplifying loud sounds less. Thus, the DSP 206 preferably also implements digital audio processing algorithms such as TILL, BILL, and/or PILL (treble, bass, and programmable increase at low levels, respectively). These processing techniques are well known and have been utilized for digital hearing aids.

A TILL processor applies more gain and high frequency emphasis to softer sounds than louder sounds and is most commonly implemented as most hearing impaired people, approximately 80% or more, experience high-frequency loss. For telephony, the high frequency band is generally considered to be 1800–3200 Hz. Subsequent discussion herein will focus on the TILL processor, TILL processing algorithm, and TILL processor application. However, it is to be understood that the TILL processing mode is only one of several digital audio modes that may be implemented in the DSP 206 and that BILL and/or PILL can be similarly implemented in the DSP 206 either alternatively or additionally.

Figure 7:
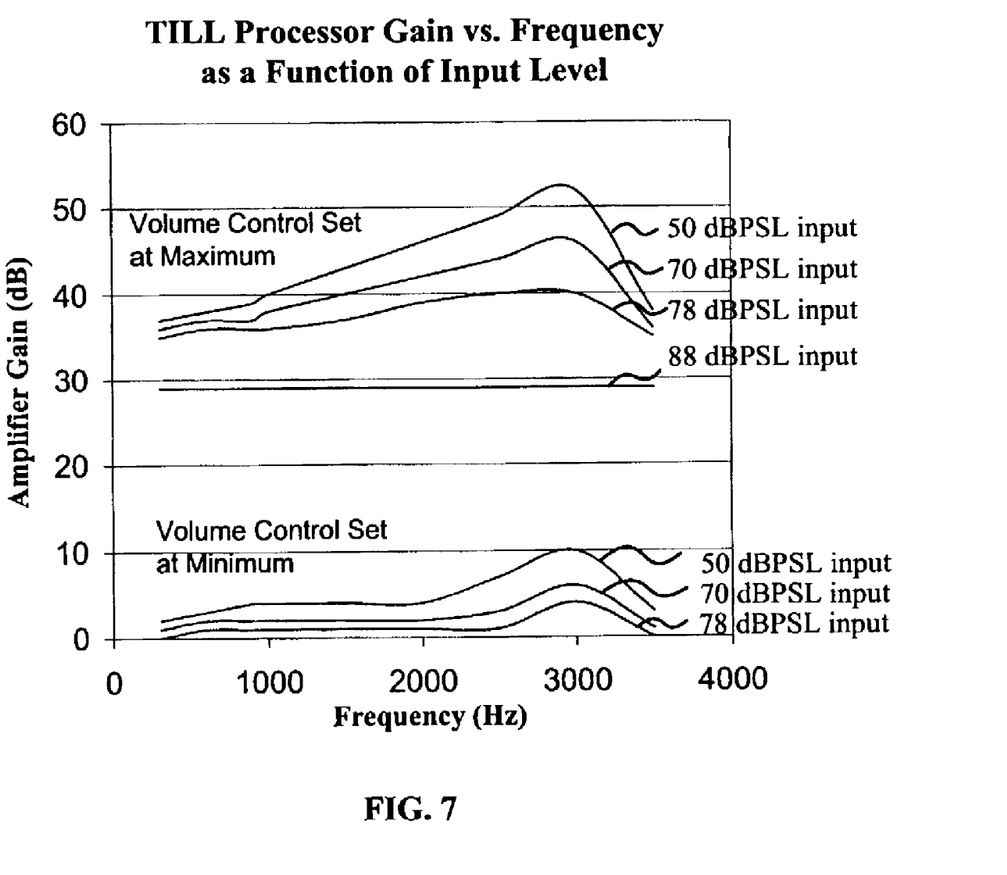
FIG. 7 is a graph illustrating the functionality of the TILL processor.

FIG. 7 is a graph illustrating the functionality of the TILL processor. Specifically, the graph of FIG. 7 illustrates the gain applied by the TILL processor as a function of input frequency for various input levels when the volume control is set to minimum or maximum. In general, the TILL processor applies less gain to higher input levels and more gain to lower input levels as shown by each set of curves corresponding to maximum and minimum volume control settings. In other words, the TILL processor amplifies soft sounds more than loud sounds. However, the amplifications applied by the TILL processor varies as a function of the volume control setting, level of the input, and frequency of the input. This is evident in FIG. 7 from the amplifier gain curves at various levels for different input loudness levels for each volume control setting.

For example, when the volume control is set at maximum, the louder the input, the less gain is applied by the TILL processor for all input frequencies. In contrast, when the volume control is set at minimum, the gain applied by the TILL processor is approximately the same for the various input loudness or levels for all input frequencies. The result is that the higher the volume control, the more the TILL processor compresses the output dynamic range. This is a desired result because the greater the hearing loss, the higher the volume control is set, and the greater the dynamic range compression is achieved by the TILL processor, thereby more closely and accurately matching the decreased or compressed dynamic range of the individual user as a result of severe hearing loss. Conversely, with less hearing loss, the lower the volume control is set, and the less the dynamic range compression is achieved by the TILL processor, thereby more closely and accurately matching the less compressed dynamic range of the individual user with only mild hearing loss.

In addition, the TILL processor also applies more amplification in the higher frequency range, approximately 1800–3200 Hz for telephony. Thus, as shown in FIG. 7, the amplification applied by the TILL processor is greater in the higher input frequencies regardless of the volume control setting. As noted above, this is also desired as the TILL processing mode is specifically designed for and tailored to hearing impaired people with the most predominate type of hearing loss in which they experience more pronounced hearing loss in the higher frequency range.

The BILL and PILL processing modes are similar except that the BILL processing mode has lower frequency emphasis (greater gain at lower frequency range, approximately 300–1000 Hz) rather than higher frequency emphasis and the PILL processing mode allows programming of the audio response as a function of, for example, volume control setting, level of the input, and frequency of the input.

DSP 206

Figure 8:
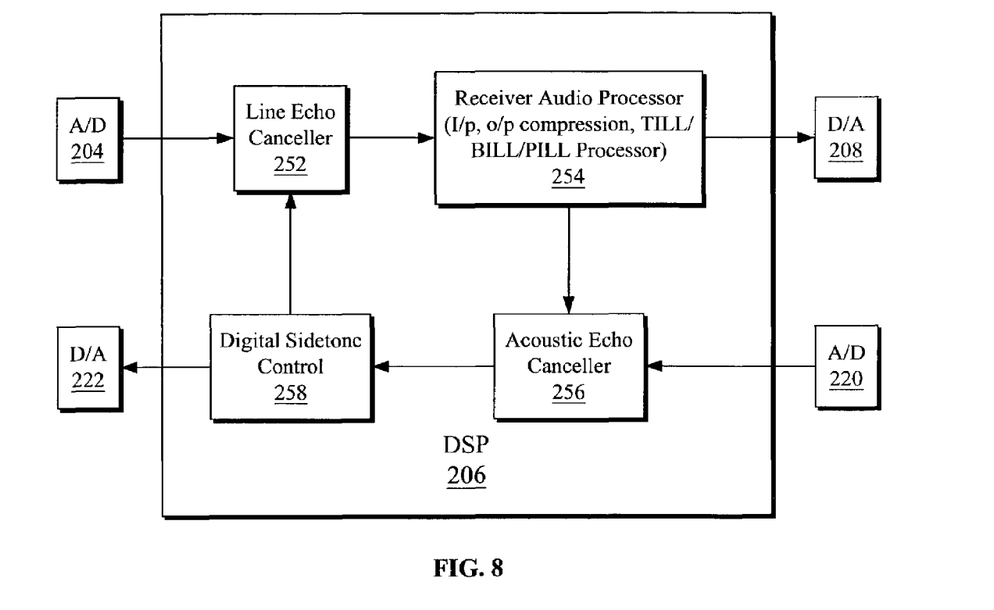
FIG. 8 is a block diagram illustrating the DSP of the amplified telephone of FIG. 3 in more detail.

FIG. 8 is a block diagram illustrating the DSP 206 in more detail. As shown, the DSP 206 generally comprises a line echo canceller 252, a receiver audio processor 254, an acoustic echo canceller 256, and a digital sidetone control 258. Sidetone refers to the portion of the user's voice that is fed back to the receiver. The acoustic echo canceller 256 enables the amplifier to achieve a gain of up to 50 dB. As noted above, the maximum gain is otherwise typically 30 dB due to feedback between the microphone and the speaker of the telephone. The feedback results in generating a howling noise at the speaker similar to when a microphone is placed too close to a public address (PA) system speaker. The acoustic echo canceller 256 removes the portion of the receive audio inadvertently captured by the microphone and retransmitted. Techniques of acoustic echo cancellation are well known and are commonly used in full duplex speaker telephones. In particular, acoustic echo cancellation allows both the transmit and receive channels to operate simultaneously by having the acoustic echo canceller 256 remove the echo and the howl from the transmit signal in real time. The cancellation effectively reduces the loop gain to less than one and ensures stability of the audio even at gain levels of 50 dB or higher. Thus, with the acoustic echo canceller 256 a gain of 50 dB can be achieved.

Figure 9:
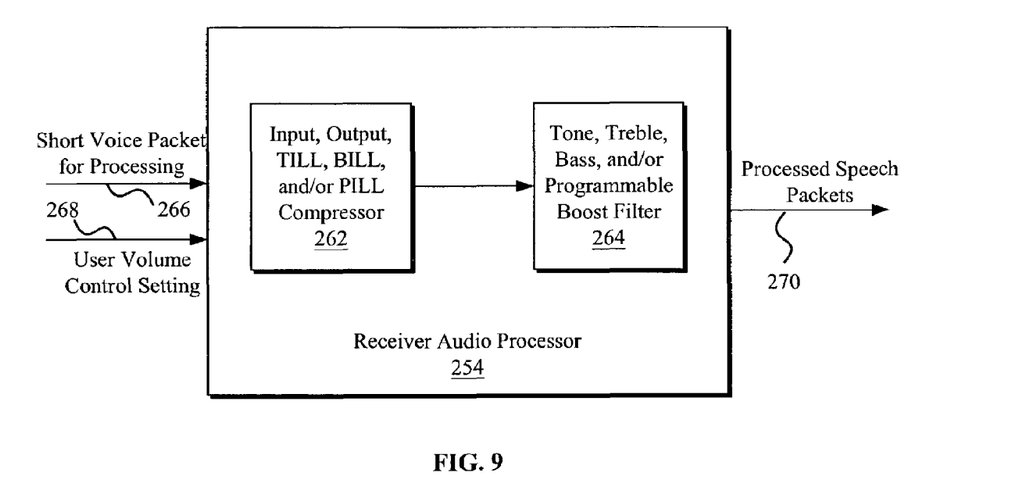
FIG. 9 is a block diagram illustrating a receiver audio processor of the DSP of FIG. 8 in more detail.

FIG. 9 is a block diagram illustrating an exemplary embodiment of the receiver audio processor 254. It is to be understood that the receiver audio processor 254 may implement any combination of input compression, output compression, tone control, TILL processing, BILL processing, PILL processing and/or other suitable modes of audio processing. In addition, although two components are shown for the processor 254, the processor 254 may implement any number of integrated and/or discrete components to enable the various modes of audio processing. The two components of the receiver audio processor 254 will now be described using TILL processing mode as an example.

As shown, the TILL portion of the receiver audio processor 254 may generally comprise a TILL compressor 262 and a treble boost filter 264. It is noted that the TILL processing portion of the receiver audio processor 254 of the DSP 206 preferably incorporates the same or similar signal processing that is commonly utilized in digital hearing aids. As an example, in TILL mode, the maximum volume control range of 50 dB may be achieved by providing 36 dB of gain internal to the DSP and 14 dB of gain external to the DSP.

The TILL compressor 262 receives as input short voice packets 266 presented for TILL processing as well as the user volume control setting 268. Although not shown, other control settings such as frequency response, compression ratios, and/or knee points may be programmed as desired. TILL processing is preferably performed in real time by determining the amount of amplification to apply to the voice packet 266 based upon the level and frequency of the input speech contained in the voice packet 266 as well as on the volume control setting.

Specifically, the TILL compressor 262 calculates from the incoming voice stream 266 a discrete-time representation of the amplitude envelope of the speech audio. This amplitude envelope information is typically calculated using a Hilbert Transformer which is well known. The output of the Hilbert Transformer is then heavily filtered using two single-pole low-pass filters to avoid excessive dithering, converted into a logarithmic value, and then compared against a set of audio compression curves (such as those shown in the graph of FIG. 7) coded into the DSP as a set of second-degree polynomials. The user's volume control setting is utilized by the TILL compressor 262 to select the specific polynomial to use to represent the active compression curve. Using the calculated audio input level and the currently active compression curve, the TILL compressor 262 calculates their difference which is then scaled to compensate for system gain blocks external to the overall TILL processor. As noted above, the volume control range of 50 dB may be achieved by providing 36 dB of gain internal to the DSP and 14 dB of gain external to the DSP. This final difference value is then linearized, i.e., its mathematical anti-log is taken, and used to scale the audio stream amplitude so as to obtain the target audio output level. The audio packets so processed are then passed in sequence to the treble boost filter 264. TILL compression is described in M. E. Frerking, Digital Signal Processing in Communication Systems, ISBN 0-442-01616-6, 1994, pp. 286–296, which is incorporated herein by reference.

The treble boost filter 264 preferably implements a generic 41-point Finite Impulse Response (FIR) digital filter of conventional structure as is well known in the field of digital hearing aid. This digital filter imparts on the compressed speech audio the specific passband response characteristic taking into account the user's volume control setting and the original audio input level prior to adjustment by the TILL compressor 262. The treble boost filter 264 maintains a set of filter coefficient vectors each corresponding to a specific desired filter response. The set of filter coefficient values for the treble boost filter 264 and the Hilbert Transform may be generated using, for example, MATLAB. The treble boost filter 264 selects and operates with a specific vector based on the most recent information on input level and user volume control setting. Some hysteresis is generally applied to the vector selection process to minimize risks of excessively frequent changes to the filter's passband characteristics that may otherwise be audible to the user. Filtered speech audio then exits the treble boost filter 264 as TILL-processed speech packets 270.

Customizing the DSP 206 to Individual Users

As noted above, the DSP 206 is preferably capable of processing audio using an audio processing mode selected from a suite of audio processing modes. As noted and described above, examples of suitable audio processing modes include input compression, output compression, TILL, BILL, PILL, and finite impulse response (FIR) filter tone control. With the various mode of audio processing, the DSP-enabled amplified telephone is preferably programmable so as to customize the audio response to the hearing impaired individual. In particular, the DSP-enabled amplified telephone preferably allows selection of a specific audio processing mode and preferably also allows programming of the audio processing mode with parameters that are specific to the individual user. By customizing the DSP to the particular type and characteristic of hearing loss specific to the user, the DSP-enabled amplified telephone can be programmed to better compensate for the user's hearing loss and thereby provide increased intelligibility. The telephone preferably allows adjustment of volume control, frequency response, compression ratios, and/or knee points of the DSP-enabled amplified telephones to achieve the desired results.

The DSP is preferably programmable by the user, a health care professional such as an audiologist, and/or a customer service representative. The user's hearing may be tested, for example, at an audiologist's office, over the DSP-enabled amplified telephone, such as via a toll-free number, on the product directly, or over the web. For example, the DSP-enabled amplified telephone may play prerecorded speech, toggling through the various audio processing modes to allow the user to identify which mode is most intelligible to and best suited for the user. Any other suitable methods for determining the best suited audio processing mode and parameters associated with the selected audio processing mode may be used.

The DSP-enabled amplified telephone preferably can be programmed to have customized settings or hearing profiles for multiple users of the same telephone such that each user's hearing profile and thus the corresponding customized audio processing is loaded automatically each time that user uses the telephone. This can be achieved by having the user press certain button(s) each time the user uses the phone and/or by utilizing voice recognition technology to differentiate among different users. For example, most people begin a conversation by saying "hello" and thus the telephone may be trained with voice recognition to differentiate among the users when the user says "hello." Such voice recognition would simplify the user identification process. This is particularly useful when the user is picking up an incoming call and may not have the opportunity to press the necessary buttons to identify oneself prior to answering the telephone call.

Figure 10:
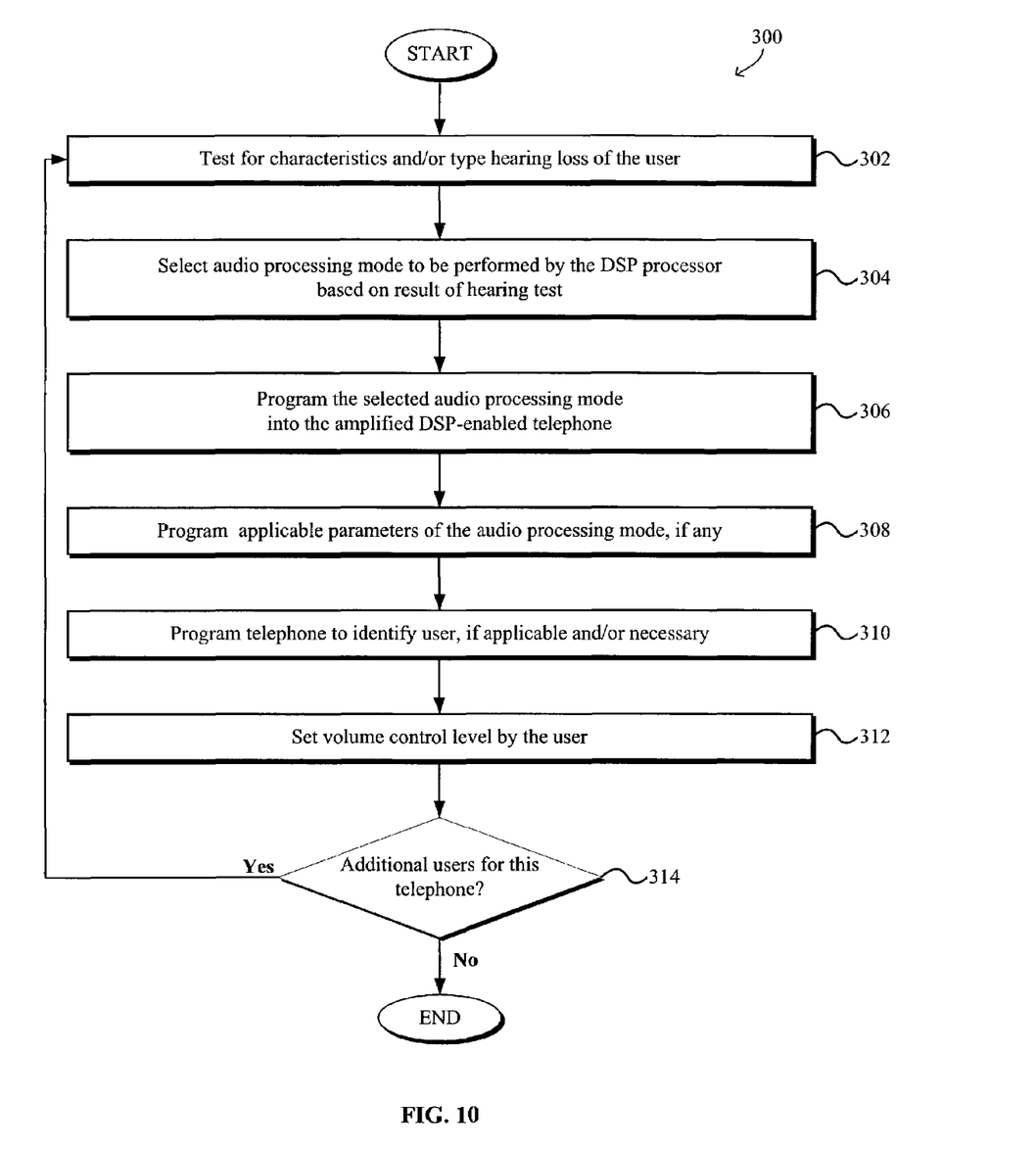
FIG. 10 is a flowchart illustrating an exemplary process for customizing the DSP-enabled amplified telephones to individual users.

FIG. 10 is a flowchart illustrating an exemplary process 300 for customizing the DSP-enabled amplified telephones to individual users. At step 302, the user is preferably tested for characteristics and/or type of hearing loss. For example, the test may be administered by an audiologist at the office of the audiologist, by a customer service representative for the telephone over a live telephone call, by the user himself using auditory tests prerecorded in the telephone itself, over the Internet, or in any other suitable manner. At step 304, the audio processing mode that is to be performed by the DSP is selected, preferably based on results of the hearing test in step 302. At step 306, the selected audio processing mode is programmed into the amplified DSP-enabled telephone. At step 308, any programmable parameters corresponding to the selected audio processing mode may be programmed. Preferably, any such programmable parameters not programmed is set to a default value or to a previously programmed value. Programmable parameters may include frequency response, compression ratios, and/or knee points. The programming of steps 306 and 308 may be performed by any combination of suitable parties or mechanisms such as by the hearing test administrator such as the audiologist, by a customer service representative, by the user, and/or automatically by the telephone.

At step 310, the telephone may optionally be programmed to identify the user, such as by assigning a particular key or keys to the user and/or learning the voice of the user with voice recognition. At step 312, the volume control level is preferably set by the user. Where the volume control is a hard switch, the telephone generally does not associate a volume control level with each user. In contrast, where the volume control is a soft switch, the volume control level may be programmed into telephone as a default level associated with the user. The volume control level may be changed at any time by the user, such as during a live telephone call. At step 314, if the telephone is to be programmed for additional users, the process 300 returns to and proceeds from step 302. Otherwise, process 300 is complete.

It is noted that the DSP-enabled methodologies described herein may be applied to corded and cordless amplified telephones. In addition, the DSP-enabled methodologies may also provide audio processing adapted for a handset and/or a headset.

While the preferred embodiments of the present invention are described and illustrated herein, it will be appreciated that they are merely illustrative and that modifications can be made to these embodiments without departing from the spirit and scope of the invention. Thus, the invention is intended to be defined only in terms of the following claims.

What is claimed is:

1. A DSP-enabled amplified telephone for providing digital signal processing of audio input resulting in increased intelligibility to a user of the telephone, comprising:
  a digital signal processor (DSP) capable of implementing at least one digital audio processing mode for processing audio input;
  a volume control allowing the user to select a volume amplification control gain from a plurality of volume amplification control gains; and
  a controller for interfacing between the DSP and the volume control, the DSP receives as input the volume control gain set by the user via the controller.

2. The DSP-enabled amplified telephone of claim 1, wherein the DSP is programmable to implement an audio processing mode tailored to the user, the audio processing mode being selected from a plurality of audio processing modes that the DSP is capable of implementing.

3. The DSP-enabled amplified telephone of claim 1, wherein the DSP is programmable with at least one of frequency response, compression ratio, and knee point according to hearing loss of the user.

4. The DSP-enabled amplified telephone of claim 1, wherein the at least one digital audio processing mode is selected from the group consisting of digital treble increase at low levels (TILL) mode, digital bass increase at low levels (BILL) mode, and digital programmable increase at low levels (PILL) mode.

5. The DSP-enabled amplified telephone of claim 4, wherein when the DSP is implementing one of the digital TILL, BILL, and PILL modes, the DSP applies more amplification to inputs at low levels than to inputs at high levels.

6. The DSP-enabled amplified telephone of claim 4, wherein the at least one digital audio processing mode includes the digital TILL mode and wherein when the DSP is implementing the digital TILL mode, the DSP applies more amplification to inputs in a higher frequency range than to inputs in lower frequencies.

7. The DSP-enabled amplified telephone of claim 6, wherein the higher frequency range is approximately 1800 Hz to 3200 Hz.

8. The DSP-enabled amplified telephone of claim 4, wherein the at least one digital audio processing mode includes the digital BILL mode and wherein when the DSP is implementing the digital BILL mode, the DSP applies more amplification to inputs in a lower frequency range than to inputs in higher frequencies.

9. The DSP-enabled amplified telephone of claim 8, wherein the lower frequency range is approximately 300 Hz to 1000 Hz.

10. The DSP-enabled amplified telephone of claim 4, wherein the at least one digital audio processing mode includes the digital PILL mode and wherein when the DSP is implementing the digital PILL mode, the DSP applies amplification according to at least one of frequency response, compression ratio, and knee point corresponding to the user as programmed into the DSP.

11. The DSP-enabled amplified telephone of claim 4, wherein the DSP is capable of implementing a second audio processing mode for processing audio input, the second audio process mode being selected from the group consisting of input compression, output compression, and finite impulse response (FIR) filter tone control.

12. The DSP-enabled amplified telephone of claim 1, wherein the DSP receives as input volume amplification control gain as set by the user.

13. The DSP-enabled amplified telephone of claim 1, further comprising an analog to digital (A/D) converter in communication with the DSP, the A/D converter converts analog signals received by the amplified telephone to digital signals for input to the DSP.

14. The DSP-enabled amplified telephone of claim 1, further comprising a digital to analog (D/A) converter in communication with the DSP and a speaker of the amplified telephone, the D/A converter converts digital signals output by the DSP to analog signals for the telephone speaker.

15. A DSP-enabled amplified telephone for providing digital signal processing of audio input resulting in increased intelligibility to a user of the telephone, comprising:
  means for digital signal processing capable of implementing at least one digital audio processing mode for processing audio input;

volume control means for allowing the user to select a volume amplification control gain from a plurality of volume amplification control gains; and controller means for interfacing between the means for digital signal processing and the volume control means, the means for digital signal processing receives as input the volume amplification control gain set by the user via the controller means.

16. A method for providing amplification tailored to characteristics of hearing loss of the user using a DSP-enabled amplified telephone, comprising the steps of:

determining hearing loss characteristics of the user;

selecting a digital audio processing mode from a plurality of audio processing modes capable of being implemented by a digital signal processor (DSP) of the DSP-enabled amplified telephone; and setting a volume amplification control gain for the DSP-enabled amplified telephone, the volume amplification control gain being selected from a plurality of volume amplification control gains.

17. A method for providing amplification of claim 16, further comprising the step of programming the DSP to implement the selected audio processing mode.

18. A method for providing amplification of claim 16, further comprising the step of programming the DSP with at least one of frequency response, compression ratio, and knee point according to result of said determining step.

19. A method for providing amplification of claim 16, wherein the digital audio processing mode is selected from the group consisting of digital treble increase at low levels (TILL) mode, digital bass increase at low levels (BILL) mode, and digital programmable increase at low levels (PILL) mode.

20. A method for providing amplification of claim 19, further comprising the step of applying more amplification to inputs at low levels than to inputs at high levels by the DSP.

21. A method for providing amplification of claim 19, wherein the selected digital audio processing mode is the digital TILL mode, further comprising the step of applying more amplification to inputs in a higher frequency range than in lower frequencies.

22. A method for providing amplification of claim 21, wherein the higher frequency range is approximately 1800 Hz to 3200 Hz.

23. A method for providing amplification of claim 19, wherein the selected digital audio processing mode is the digital BILL mode, further comprising the step of applying more amplification to inputs in a lower frequency range than inputs in higher frequencies.

24. A method for providing amplification of claim 23, wherein the lower frequency range is approximately 300 Hz to 1000 Hz.

25. A method for providing amplification of claim 19, wherein the selected digital audio processing mode is the digital PILL mode, further comprising the steps of:

programming the DSP with at least one of frequency response, compression ratio, and knee point corresponding to the user; and applying amplification in accordance with the programmed frequency response, compression ratio, and/or knee point.

26. A method for providing amplification of claim 25, wherein the programmed frequency response, compression ratio, and/or knee point is determined from the step of determining hearing loss characteristics of the user.

27. A method for providing amplification of claim 16, wherein the DSP is capable of implementing a second audio processing mode for processing audio input, the second audio process mode being selected from the group consisting of input compression, output compression, and finite impulse response (FIR) filter tone control.

28. A method for providing amplification of claim 16, further comprising the step of amplifying input sounds using the DSP depending upon the volume amplification control gain set by the user.

29. A method for providing amplification of claim 16, further comprising the step of converting analog signals received by the amplified telephone to digital signals for input to the DSP.

30. A method for providing amplification of claim 16, further comprising the step of converting digital signals output by the DSP to analog signals for a telephone speaker.

* * * * *